United States Patent [19]

Keating

[11] Patent Number: 5,423,351

[45] Date of Patent: Jun. 13, 1995

[54] FASTENER FOR TUBE PLUG

[75] Inventor: Robert F. Keating, Penn Township, Pa.

[73] Assignee: Westinghouse Electric Corporation, Pittsburgh, Pa.

[21] Appl. No.: 94,544

[22] Filed: Jun. 21, 1993

Related U.S. Application Data

[62] Division of Ser. No. 699,416, May 13, 1991, Pat. No. 5,249,604.

[51] Int. Cl.6 .............................................. F16L 55/12
[52] U.S. Cl. ...................................... 138/89; 376/203; 411/338; 411/339; 411/201
[58] Field of Search ..................... 138/89; 411/339, 55, 411/201, 338; 165/71, 76; 376/203, 204; 220/235, 236, 241, 242

[56] References Cited

U.S. PATENT DOCUMENTS

| | | | |
|---|---|---|---|
| 467,130 | 1/1892 | Finnigan | 411/338 |
| 1,259,214 | 3/1918 | DeRoja | 411/338 |
| 1,718,171 | 6/1929 | Mills | 411/338 |
| 1,951,228 | 3/1934 | Woodward | 411/201 |
| 2,730,419 | 1/1956 | Wathrows et al. | 411/338 |
| 3,221,589 | 12/1965 | Vader Sande et al. | 411/338 |
| 3,702,087 | 11/1972 | Schmitt | 411/339 |
| 3,771,410 | 11/1973 | Swindt | 411/338 |
| 4,358,079 | 11/1982 | Navarro | 411/339 |

Primary Examiner—James E. Bryant, III
Attorney, Agent, or Firm—D. G. Maire

[57] ABSTRACT

A fastener for fastening together a plurality of members, such as the plurality of members comprising a tube plug, and a method for plugging an opening in a solid member, which may be a tube, for preventing the flow of fluid through the opening in a solid member or through the tube, such as a nuclear steam generator tube, comprises a first member, such as a shell, a second member, such as a bolt, and locking structure. A deformable tab portion of the locking structure may have an undercut positioned so that when the second member is installed within the first member, a first surface of the undercut is bent toward a second surface of the undercut thereby plastically deforming the tab portion into a recess in at least one of the first and the second members for automatically securing together the plurality of members.

8 Claims, 7 Drawing Sheets

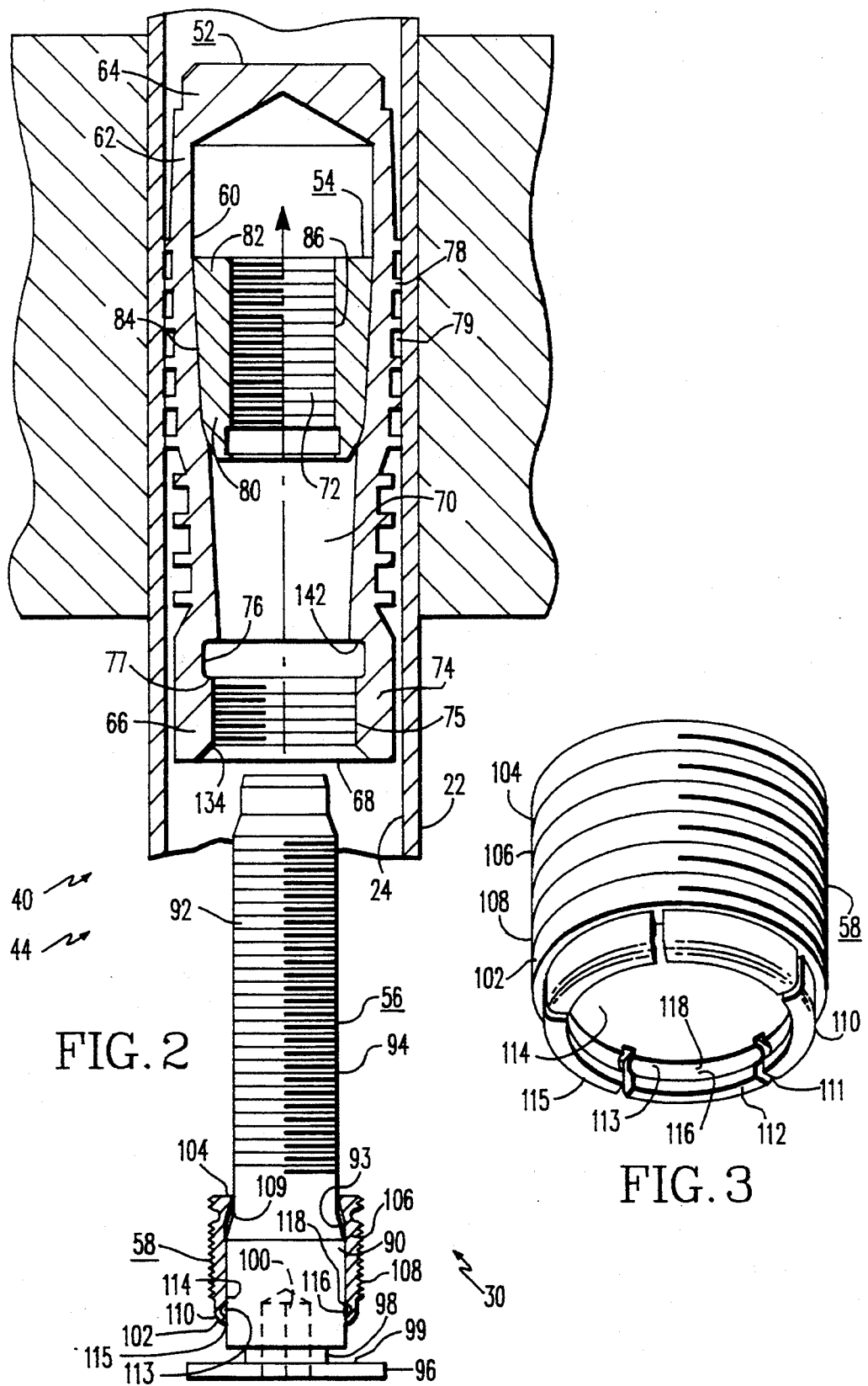

FASTENER FOR TUBE PLUG

This is division of application Ser. No. b 07/699,416 filed May 13, 1991, now U.S. Pat. No. 5,249,601.

BACKGROUND OF THE INVENTION

1. Field of the Invention

This invention relates to the fastening of a plurality of members together and, more particularly, to a tube plug and method for plugging a heat exchanger tube in a nuclear steam generator.

2. Description of the Prior Art

In tube-type heat exchangers, a first fluid flows through the tubes of the heat exchanger while a second fluid surrounds the outside of the tubes such that heat exchange occurs between the two fluids. Occasionally, one of the tubes can become defective such that a leak either is impending or occurs therein which allows the two fluids to mingle. When this occurs, it is sometimes necessary to plug the tube so that the fluid does not flow through the tube thereby preventing leakage from the tube.

In nuclear reactor power plants, the tube-type heat exchangers are commonly referred to as steam generators. When a defect occurs in the tubes of a nuclear steam generator that allows the primary fluid in the tubes to mingle with the secondary fluid outside of the tubes, a more significant problem arises. Not only does this situation create an ineffective heat exchanger, but it also creates a radioactive contamination problem. Since the fluid flowing in the tubes of a nuclear steam generator may contain some radioactivity, it is important that it not be allowed to leak from the tubes and possibly contaminate the fluid surrounding the tubes and the equipment which it contacts. Therefore, when the possibility of a leak occurs in a nuclear steam generator heat exchange tube, the heat exchange tube is plugged so that the primary fluid is not permitted to flow through the tube.

There are several kinds of mechanical plugs that can be used to plug heat exchange tubes. One such device used to plug heat exchange tubes in nuclear steam generators is disclosed in U.S. Pat. No. 4,982,763 issued Jan. 8, 1991 to Klahn entitled "Plug Retainer". The plug retainer for retaining a tube plug comprises a locking cup having a bore therethrough and an externally threaded lower portion adapted to be threadably received in the open threaded end of the tube plug and a cap screw having a threaded shank threadably receivable in the threaded mandrel of the tube plug. The locking cup is crimped onto the cap screw by the use of flutes on the cap screw head. However, utilization of the locking cup requires the additional steps of threading the locking cup into the open threaded end of the tube plug and of crimping the locking cup into the flutes of the cap screw.

Another type of mechanical plug is disclosed in co-pending application Ser. No. 07/439,118 filed Nov. 20, 1989 (now abandoned) by Haberman et al. and assigned to the assignee of the present invention. The tube plug for plugging a tube to prevent flow through the tube comprises a shell, an expander member, and a sealing member to seal the chamber defined by the shell. To lock or fasten the sealing member to the shell to prevent the sealing member and shell from separating, the sealing member and shell are welded together. The installation of the sealing member into the shell seals the open end of the shell to prevent coolant from entering the chamber of the shell and exerting pressure on the plug wall, and occupies space within the chamber of the shell to reduce the possibility of residual stresses within the plug wall. Although the tube plug successfully plugs tubes, welding the sealing member and the shell together requires the additional steps of welding and of inspection of the weld during the installation of the tube plug into the tube. Also, if the shell of the tube plug has been recessed a distance into the tube, the sealing member cannot be welded to the shell, and therefore the sealing member and shell cannot be locked or fastened together by welding.

Another type of mechanical plug is disclosed in application Ser. No. 07/699,406 filed May 13, 1991, now U.S. Pat. No. 5,194,214 (W.E. 56,408) filed concurrently herewith by Snyder et al. entitled "Tube Plug and Method for Plugging a Tube" and assigned to the assignee of the present invention. The tube plug for plugging a tube to prevent flow through the tube comprises a shell, an expander member, bolt means to seal the chamber defined by the shell, and locking means for securing the shell, bolt means and locking means together. The bolt means reduces the possibility of residual stresses within the plug wall. However, utilization of the locking means requires the additional steps of threading the locking means into the shell and of crimping the locking means into the bolt means.

Therefore, what is needed is a tube plug and method for installing a tube plug that automatically locks or fastens together the plurality of members comprising the tube plug by the installation of the bolt means into the shell of the tube plug.

SUMMARY OF THE INVENTION

A fastener means for fastening a plurality of members together, such as the plurality of members comprising a tube plug, for preventing the flow of fluid through the opening or tube, such as a nuclear steam generator tube, comprises locking means for automatically locking or fastening together the plurality of members comprising the tube plug, during the installation of the tube plug into the tube. In some forms of the invention, the tube plug comprises a first member, such as a shell, having a bore at least partially therein, a second member, such as a bolt means, disposed in the bore of the first member, and locking means having a deformable tab portion. The deformable tab portion may have an undercut positioned so that when the second member is installed within the first member, a first surface of the undercut is bent toward a second surface of the undercut thereby plastically deforming the tab portion into a recess in at least one of the first and second members for securing the first and second members together. The tube plug may also comprise an expander member having threads with a different pitch size than the threads of the locking means thereby providing an additional locking Or fastening feature of the tube plug.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 2 is an exploded view and partial vertical section of a tube plug comprising one embodiment of this invention;

FIG. 3 is an isometric view of the locking cup of FIG. 2 having a castellated tab portion;

DESCRIPTION OF THE PREFERRED EMBODIMENT

The invention described herein provides a fastener means for fastening a plurality of members together, such as the plurality of members which form a tube plug, and method for plugging an opening in a solid member, which may be a tube, e.g. a nuclear steam generator tube, capable of automatically securing together the plurality of members comprising the tube plug, during the installation of the tube plug into the tube for preventing the flow of fluid through the tube.

Figure 1:
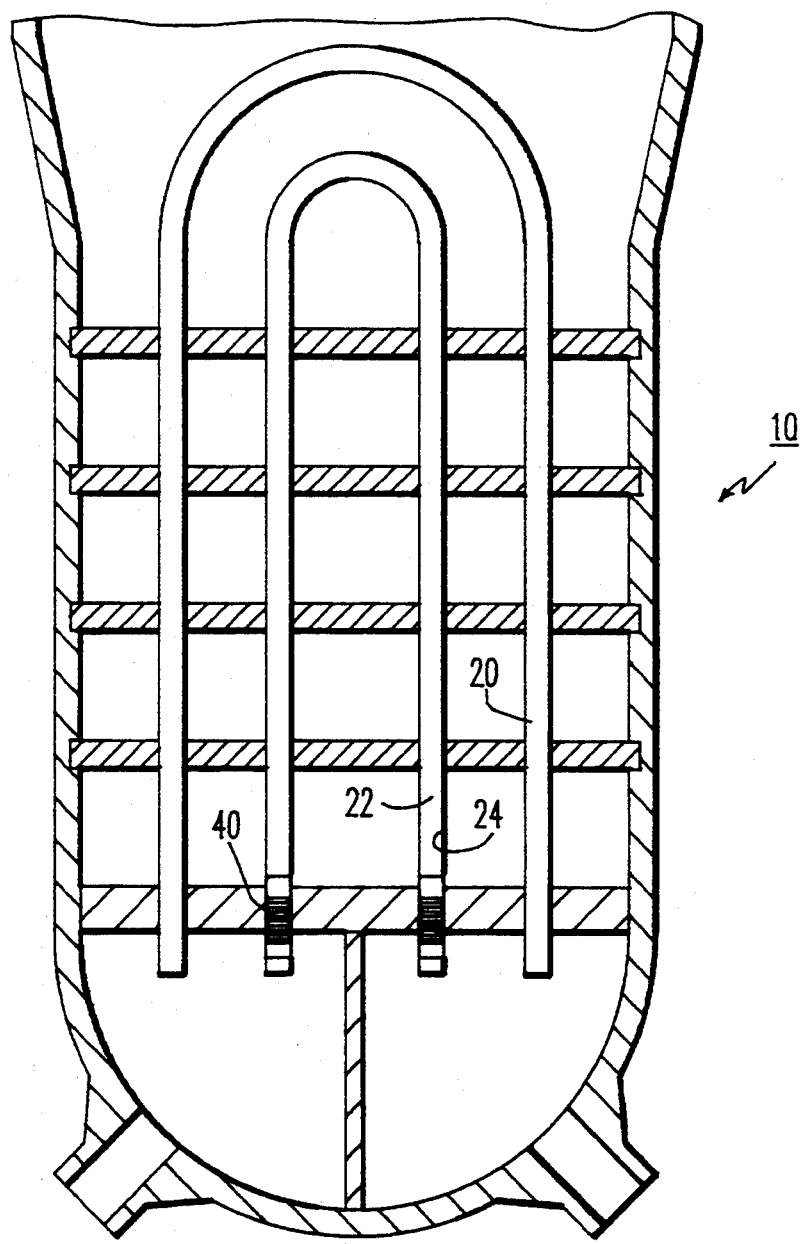
FIG. 1 is a schematic illustration of a steam generator in partial vertical section with parts removed for clarity and also shows two steam generator tubes, one of the tubes having tube plugs disposed in the open ends of the tube.

Referring to FIG. 1, steam generator 10 is schematically shown having a plurality of tubes 20 (only two of which are shown) disposed therein. One of the tubes 20, for example a tube 22 having an inner wall 24, may have become degraded after extended service due to vibration or primary water stress corrosion cracking. Tube 22 may have a crack therethrough which will allow the commingling of the radioactive primary fluid in tube 22 with the nonradioactive secondary fluid outside tube 22. To prevent any such fluid commingling, steam generator 10 is taken out of service in a manner well known in the art and a tube plug 40 is disposed in both open ends of tube 22 for plugging the degraded tube 22. After tube 22 is plugged, steam generator 10 is returned to service. Tube plug 40 prevents the flow of primary fluid through tube 22. However, the stress corrosion cracking which may have caused tube 22 to degrade may also affect tube plug 40 and thus cause tube plug 40 to likewise degrade.

Referring to FIG. 2, a fastener means for securing a plurality of members together is referred to generally as 44. As an example, the fastener means 44 fastens together the plurality of members comprising the tube plug 40, such as a first member or shell 52, an expander member 54, a second member or bolt means 56, and locking means, such as the locking cup 58.

Referring to FIGS. 2–5, shell 52 is a substantially cylindrical member manufactured from a metal, such as Inconel 600. The metal Inconel is an alloy composed substantially of nickel, chromium, and iron and a trace amount of cobalt. Shell 52 has a conical inner surface 60 of an outer wall 62, which has a larger diameter at a closed end 64 of shell 52 and a smaller diameter at an open end 66 of shell 52 and a bore 68 at least partially therethrough. The closed end 64, open end 66 and outer wall 62 define a chamber 70 in the shell 52. Disposed in chamber 70 is the expander member 54, which may have a threaded cylindrical bore 72 therethrough, for expanding the outer wall 62 of the shell 52 into sealing engagement with the inner wall 24 of tube 22 for plugging tube 22. Inner surface 60 is formed such that expander member 54 is captured within shell 52 so that movement of expander member 54 relative to inner surface 60 causes shell 52 to expand without allowing expander member 54 to be removed from shell 52.

Shell 52 has a threaded cylindrical skirt portion 74 near open end 66, which has a diameter larger than the smallest diameter of inner surface 60 of outer wall 62 for allowing an apparatus (not shown), such as a tool for manipulating the expander metier 54, to be threadedly engaged in the skirt portion or to be inserted through the threaded skirt portion 74 and into chamber 70. The skirt portion 74 has inside diameter threads 75 for threadedly engaging the locking cup 58. The skirt portion 74 also has a recess 76 positioned adjacent to and inward of the inward end 77 of the inside diameter threads 75 of the skirt portion 74 for providing thread relief to the inside diameter threads 75.

Shell 52 also has a substantially uniform wall thickness in the portion of the shell 52 that is expanded by expander member 54. A plurality of outer lands 78 may be integrally formed on the outer surface 79 of shell 52 in a manner such that the height of each land 78 increases from closed end 64 to open end 66 while the outer surfaces of all lands 78 are maintained at approximately the same external diameter and while the wall thickness of shell 52 remains substantially constant throughout the portion of shell 52 where the lands 78 are located. The lands 78 may provide an enhanced seal between the shell 52 and the tube 22. Shell 52 is also constructed such that the skirt portion 74 near the open end 66 has a thicker wall section than the remainder of the shell 52 to provide stability in extracting tube plug 40.

Prior to the completion of manufacture of the shell 52, the expander member 54 is installed through the open end 66 of the shell 52 and into the chamber 70 of the shell 52. Then, the shell 52 is swaged so that the expander member 54 is captured within the shell 52.

Still referring to FIGS. 2–5, the expander member 54 may be manufactured from a hardenable metal, such as Carpenter 455 and may be formed such that it has a leading end 80, which has a tangentially blended radius that minimizes "plowing" or pushing metal ahead of expander member 54 when expander member 54 is pulled through shell 52. Expander member 54 may also have a polished exterior surface that enhances its movement relative to shell 52. Expander member 54 also has a trailing edge 82, which is formed to have a sharp edge such that it provides a self-locking mechanism. While the sharp edge feature of trailing edge 82 retains expander member 54 from moving toward closed end 64 of shell 52, thereby preventing inadvertent diametral contraction of shell 52, the construction of expander member 54 is such that the sharp edge feature of trailing edge 82 does not prevent expander member 54 from being pushed toward closed end 64 by a plug removal tool (not shown).

Expander member 54 is also provided with a conical outer surface 84 that is arranged such that its outside diameter is smaller near leading end 80 and larger near trailing edge 82. The shape of outer surface 84 provides a mechanism for expanding shell 52 when expander member 54 is moved relative to shell 52. Expander member 54 also has inside diameter threads 86, which may be used for gripping a plug installation tool (not shown) during the expansion process and can be used to engage the bolt means 56. As described hereinabove, the shell 52 and expander member 54 may be of the type disclosed in U.S. Pat. No. 4,390,042 issued Jun. 28, 1983 to Kucherer et al. entitled "Tube Plug" and assigned to the assignee of the present invention.

Still referring to FIGS. 2–5, the bolt means 56 has an outward end portion 90, an inward end portion 92, and a taper 93 positioned between the outward end portion 90 and the inward end portion 92. When disposed through the open end 66 of the shell 52, the outward end portion 90 is defined as that end portion of bolt means 56 nearer open 66 of the shell 52 and the inward end portion 92 is defined as that end portion of bolt means 56 nearer closed end 64 of the shell 52. The inward end portion 92 may have outside diameter threads 94 corresponding to inside diameter threads 86 of the expander member 54 for threaded engagement of the bolt means 56 and the expander member 54. Bolt means 56 may be manufactured from a metal, such as Inconel 690, for resisting stress corrosion cracking.

Bolt means 56 has a substantially circular flange 96 integrally attached to the outward end portion 90. The flange 96 extends radially outward from the outward end portion 90 of the bolt means 56 and across the open end 66 of the shell 52 for closing the open end 66, and thereby sealing the chamber 70 defined by the shell 52. The flange 96 may also function as a means for preventing over insertion of the bolt means 56 into shell 52 because flange 96 will abut open end 66 when bolt means 56 is suitably inserted in shell 52. The bolt means 56 has a circumferential recess 98 positioned near and adjacent to the flange 96. Recess 98 and flange 96 have a common surface, referred to as surface 99. The outward end portion 90 of bolt means 56 has a cavity 100, such as a hexagonal hole, for receiving an apparatus (not shown) capable of inserting the bolt means 56 into and retrieving bolt means 56 from the shell 52 and the expander member 54. The outward end portion 90 of the bolt means 56 has a larger diameter than the inward end portion 92 of the bolt means 56 for expanding the locking cup 58 into the skirt portion 74 of the shell 52 during installation of the bolt means 56 and of the locking cup 58 into the shell 52. Because the exact position of the expander member 54 within the shell 52 may not be known, the length of the bolt means 56 should be sufficient for the outside diameter threads 94 to engage with the inside diameter threads 86 of any installed expander member 54.

By fully installing the bolt means 56 into the shell 52, fluid is prevented from corrosively attacking the inner surface 60 of the shell 52. Also, the bolt means 56 occupies space within the chamber 70, thereby reducing the liquid volume within the chamber 70 so that any stored energy in the chamber 70 is minimized. Sealing the chamber 70 and reducing the liquid volume within the chamber 70 provides a tube plug 40 having reduced susceptibility to stress corrosion cracking.

Still referring to FIGS. 2–5, the locking cup 58 is an annular member having a outward open end 102, an inward open end 104, and a wall 106. Wall 106 may have outside diameter threads 108 between the outward open end 102 and the inward open end 104 corresponding to the inside diameter threads 86 of the skirt portion 74 of the shell 52 for threaded engagement of the locking cup 58 and the shell 52. The inside diameter threads 75 of the shell 52 and the outside diameter threads 108 of the locking cup 58 have a larger pitch than the inside diameter threads 86 of the expander member 54 and the outside diameter threads 94 of the bolt means 56 for enabling the locking cup 58 to advance faster into the shell 52 than the bolt means 56 advances into the expander member 54. The difference in pitch size also provides an additional locking effect for the bolt means 56, locking cup 58, and shell 52. The inward open end 104 has a tapered internal diameter 109 which expands, during installation of the locking cup 58 and the bolt means 56 into the shell 52, as the locking cup 58 progresses along the bolt means 56 from the inward end portion 92 toward the outward end portion 90, to engage the recess 76 in the skirt portion 74 of the shell 52. Once expanded, the combined diameter of the outward end portion 90 of the bolt means 56 and of the locking cup 58 is greater than the internal diameter of the inside diameter threads 75 of the skirt portion 74, thereby restricting removal of the bolt means 56 and of the locking cup 58 as a unit.

Figure 4:
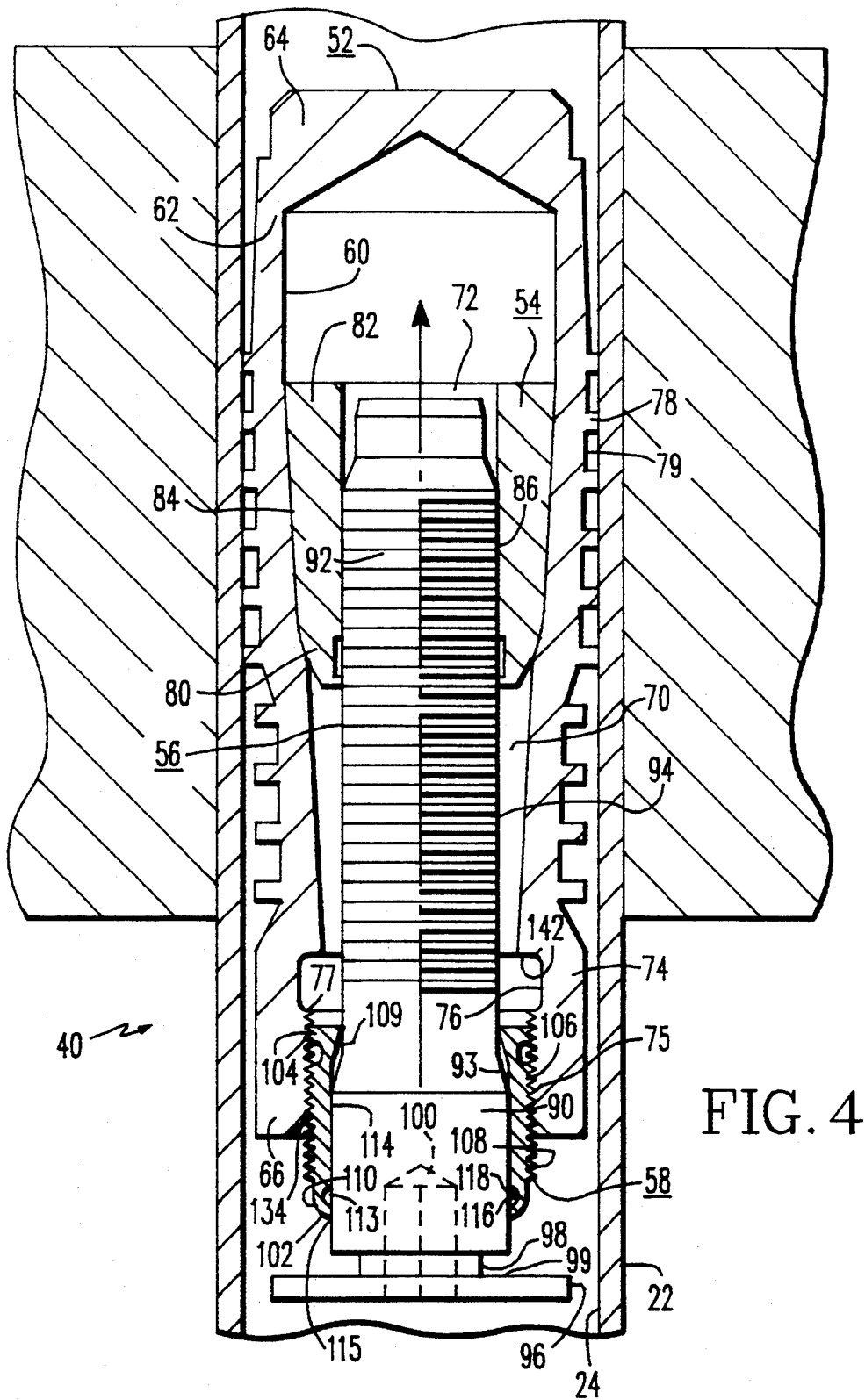
FIG. 4 is a partial vertical section of the tube plug of FIG. 2 having bolt means partially installed within a shell of the tube plug, and having the locking cup of FIG. 3 advancing along the bolt means.
Figure 5:
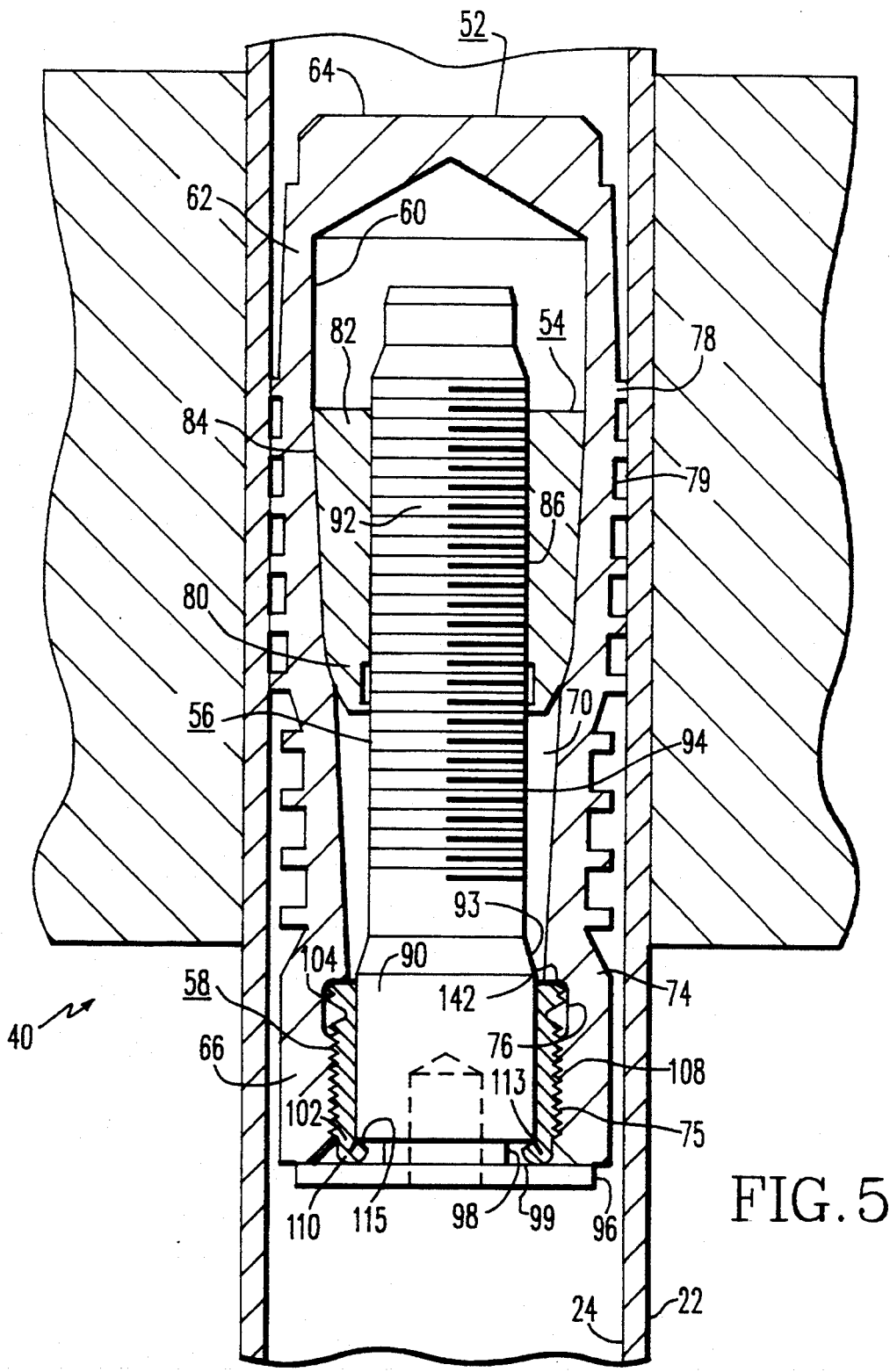
FIG. 5 is a partial vertical section of the tube plug illustrated in FIGS. 2–4 having the bolt means and locking cup of FIG. 3 fully installed within the shell of the tube plug.
Figure 8:
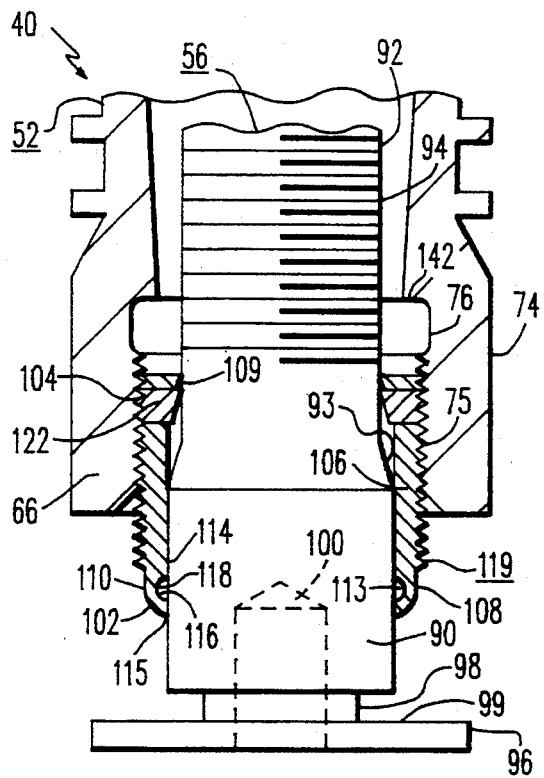
FIG. 8 is a partial vertical section of an alternative embodiment of the tube plug having common parts removed for clarity and having the bolt means and locking cup of FIG. 6 partially installed within the shell of the tube plug.
Figure 6:
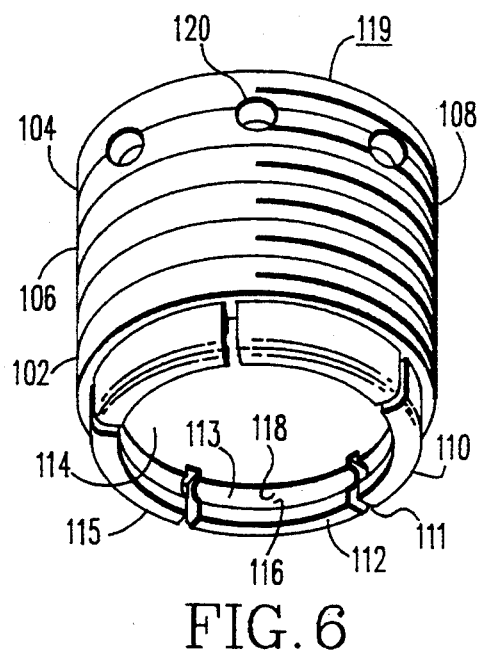
FIG. 6 is an isometric view of an alternative embodiment of the locking cup employable with the embodiment of FIG. 8 having a castellated tab portion and one or more pin receiving openings.
Figure 9:
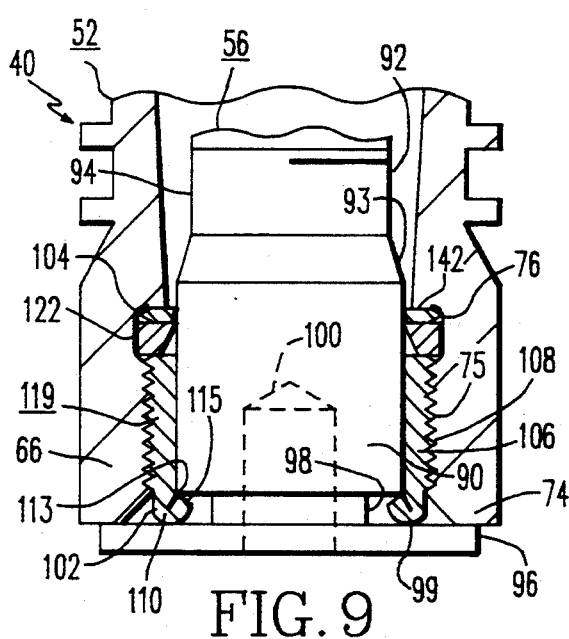
FIG. 9 is a partial vertical section of the tube plug illustrated in FIG. 8 having the bolt means and locking cup of FIG. 6 fully installed within the shell of the tube plug.
Figure 7:
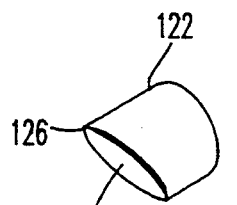
FIG. 7 is an isometric view of a pin employable with the locking cup of FIG. 6.
Figure 12:
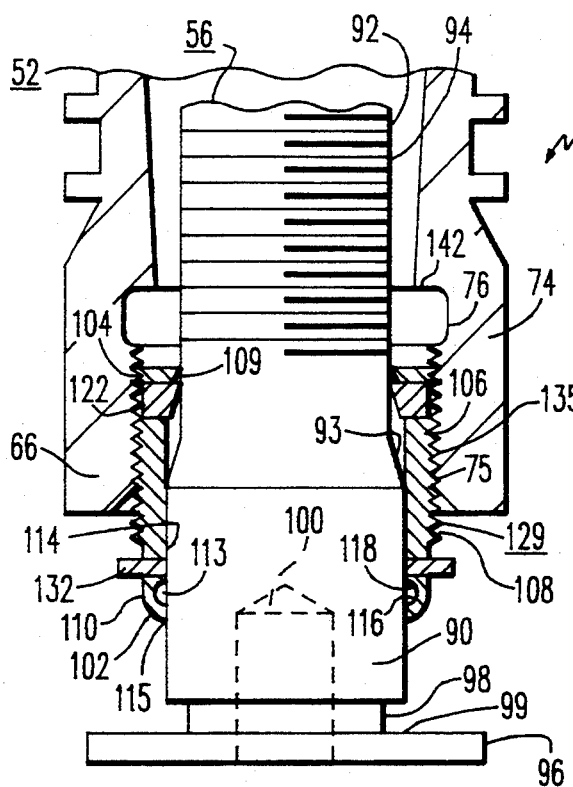
FIG. 12 is a partial vertical section of still another alternative embodiment of the tube plug having common parts removed for clarity and having the bolt means and locking cup of FIG. 10 partially installed within the shell of the tube plug.
Figure 10:
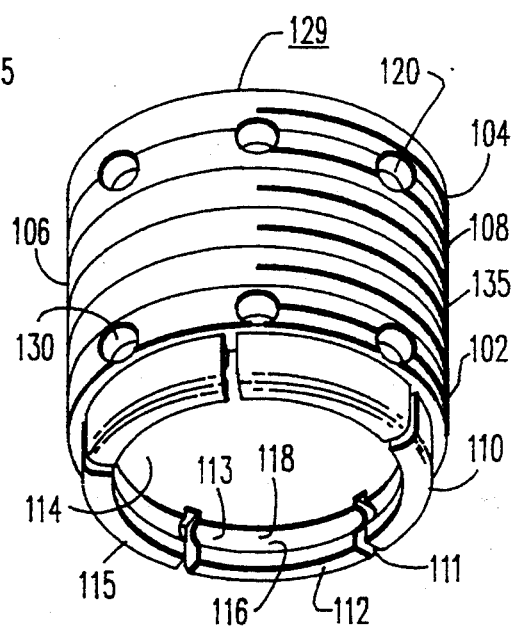
FIG. 10 is an isometric view of still another alternative embodiment of the locking cup employable with the embodiment of FIG. 12 having a castellated tab portion and one or more pin receiving openings.
Figure 13:
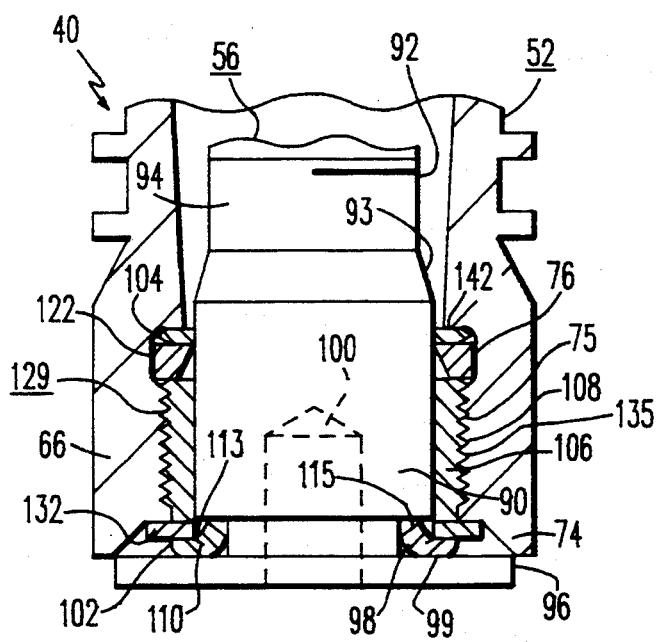
FIG. 13 is a partial vertical section of the tube plug illustrated in FIG. 12 having the bolt means and locking cup of FIG. 10 fully installed within the shell of the tube plug.
Figure 11:
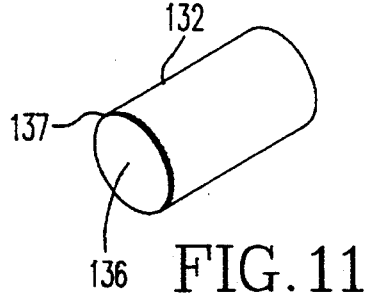
FIG. 11 is an isometric view of a pin employable with the locking cup of FIG. 10.

Referring to FIG. 3, locking cup 58 further comprises a deformable tab portion 110, positioned at the outward open end 102 of the locking cup 58, for engagement with the bolt means 56 for securing together the bolt means 56, the locking cup 58, and the shell 52. The tab portion 110 is a series of slits 111 in the tab portion 110 and a series of castellated tabs 112 for relieving the hoop stress in the tab portion 110 during deformation. The series of castellated tabs 112 may be a series of projecting tabs integrally formed on the tab portion 110. The tab portion 110 has an undercut 113 on the inside diameter 114 of the tab portion 110 for providing flexibility to enable the tab portion 110 to be deformed. The tab portion also has an end 115. The tab portion 110 is originally in the straight position as illustrated in FIG. 4, which enables the locking cup 58 to be slid onto the inward end portion 92 of the bolt means 56 and toward the outward end portion 90 of the bolt means 56 until the locking cup 58 tightly fits onto the taper 93 and onto the outward end portion 90 of the bolt means 56. The tab portion 110, which may be manufactured from a deformable metal, such as Inconel 690, is deformed so that a first surface 116 of the undercut 113 is bent toward a second surface 118 of the undercut 113 and is in a position as illustrated in FIGS. 4 and 5. The plastically deformed tab portion 110 will retain this bent position with minimal spring-back to the straight position.

The initial length of the locking cup 58 may be longer than the internal clearance between the flange 96 of the bolt means 56 and the recess 76 of the skirt portion 74. During installation of the bolt means 56, the frictional fit between the locking cup 58 and the bolt means 56 will cause the locking cup 58 to thread into the skirt portion 74 of the shell 52. As the bolt means 56 is installed, due to the difference of pitch between the locking cup 58 and the bolt means 56 and due to the longer initial length of the locking cup 58, the locking cup 58 will seat in the recess 76 prior to the flange 96 abutting the shell 52. As the bolt means 56 and the locking cup 58 continue to thread into the shell 52, the flange 96 or surface 99 abuts an end 115 of tab portion 110 and plastically deforms the tab portion 110 into the recess 98 of the bolt means 56 to provide an interference of the tab portion 110 of the locking cup 58 with the recess 98 of the bolt means 56 for fastening or locking the bolt means 56 and the locking cup 58 together. The locking cup 58 also prevents inadvertent backward movement of the bolt means 56 relative to the shell 52. The tab portion 110 is sized for known forces such that the torque required to plastically deform the tab portion 110 from the recess 98 for removal of the bolt means 56 and the locking cup 58 is higher than the torque expected to be applied to the bolt means 56 during service of the steam generator. By planning the size of the tab portion 110, if the tube plug 40 needs to be removed from the tube 22, the tube plug 40 may be efficiently removed from the tube 22.

By utilizing locking means, such as the locking cup 58, the plurality of members comprising the tube plug 40 are automatically locked or fastened together by the installation of the bolt means 56 into the shell 52. By locking or fastening the members together, the chamber 70 remains sealed to prevent fluid from entering the chamber 70 and corrosively attacking the inner surface 60 of the shell 52. The locking or fastening feature also prevents a separation of the members, which may result in loose parts moving throughout the steam generator.

For the various embodiments of this invention, the same reference characters will be used to designate like parts. In addition, like functions and like interactions of parts among the various embodiments of this invention will not be repeated for each embodiment. In the embodiments of FIGS. 6-9, FIGS. 10-13, and FIGS. 14-16, certain parts of the tube plug 40 have been left out of the drawings as these parts are, duplicates of corresponding parts of the tube plug 40 in FIGS. 2-5. Alternative embodiments of this invention comprise tube plug 40 employing various locking means.

Referring to FIGS. 6-9, an alternative embodiment of the locking cup 58 as illustrated in FIGS. 2-5 is a locking cup 119 having like parts as locking cup 58 and additionally having one or more openings 120 positioned near the inward open end 104 of wall 106. One or more pins 122 sized to fit within the openings 120 may be positioned within the openings 120 to provide a pressure fit between the pins 122 and the locking cup 119.

In addition to functioning similarity to the embodiment illustrated in FIGS. 2-5, as the locking cup 119 is installed, the pins 122 have an inclined surface 124 (as shown), which enables the pins 122 to slide along the taper 93 of the bolt means 56 until the pins 122 are forced outward by the taper 93 to engage in the recess 76 positioned adjacent to the inside diameter threads 75 of the skirt portion 74 of the shell 52. The engagement of the pins 122 with the recess 76 provides an interference of the pins 122 with the inside diameter threads 75 of the skirt portion 74 of the shell 52 for locking or fastening the bolt means 56 and the shell 52. The inclined surface 124 of the locking cup 119 has a first edge 126 at one end for enabling the pins 122 to penetrate a distance into the bolt means 56 for providing an interference between the pins 122 and the bolt means 56. By utilizing the pins 122, the wall 106 of the locking cup 119 need not comprise the outside diameter threads 108 nor the tab portion 110. Although the pins 122 may fasten or lock the bolt means 56, the locking cup 119, and the shell 52, it is preferable to utilize the outside diameter threads 108 and the tab portion 110 for providing an additional locking or fastening feature. The pins 122 may be manufactured from a metal, such as Inconel 718, which is harder than the metal used to manufacture the tab portion 110, to provide a stronger locking feature than the locking feature of the tab portion 110.

Referring to FIGS. 10-13 and using the same reference characters to define like parts, an alternative embodiment of the locking cup 119 as illustrated in FIGS. 6-9 may be locking cup 129 having like parts as locking cup 119 and additionally having one or more openings 130 positioned near the outward open end 102 of wall 106. One or more pins 132 sized to fit within the openings 130 are positioned within the openings 130 to provide a pressure fit between the pins 132 and the locking cup 129. In addition to functioning similarly to the embodiment illustrated in FIGS. 6-9, as the locking cup 129 is installed, the pins 132 may be forced to be positioned in the recess 98 of the bolt means 56 utilizing a sloped counterbore 134 positioned at the open end 66 of the shell 52. The locking cup 129 also has a collapsible section 135 positioned between the outward open end 102 and the inward open end 104 of the locking cup 129 to permit engagement of the pins 122 prior to contact of the pins 132 with the shell 52. The pins 132 have a surface 136 with a second edge 137 for enabling the pins 132 to penetrate a distance into the shell 52 for providing an interference between the pins 132 and the shell 52. By utilizing the of pins 122 and the pins 132, the wall 106 of the locking cup 129 need not comprise the outside diameter threads 108 nor the tab portion 110. Although the pins 122 and pins 132 fasten or lock the bolt means 56, the locking cup 129, and the shell 52, it is preferable to utilize the outside diameter threads 108 and the tab portion 110 for providing an additional locking or fastening feature. The pins 132 may be manufactured from a metal, such as Inconel 718, which is harder than the metal used to manufacture the tab portion 110, to provide a stronger locking feature than the locking feature of the tab portion 110.

Figure 14:
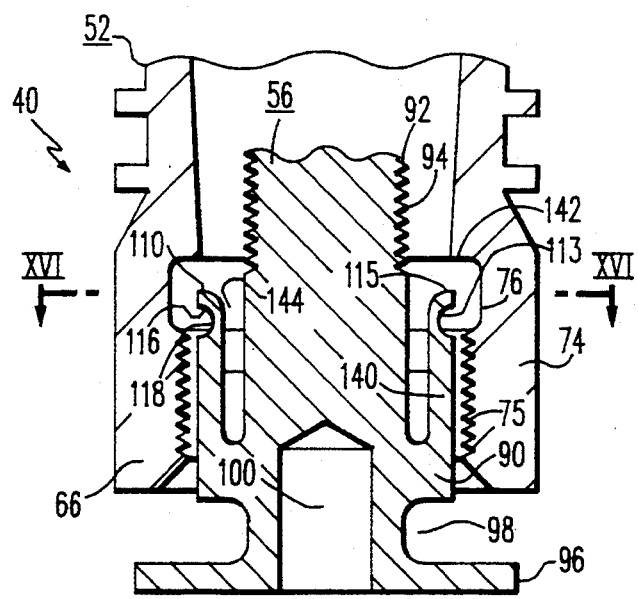
FIG. 14 is a partial vertical section of still another alternative embodiment of the tube plug having common parts removed for clarity and having the bolt means integrally formed with the locking means and partially installed within the shell of the tube plug.
Figure 16:
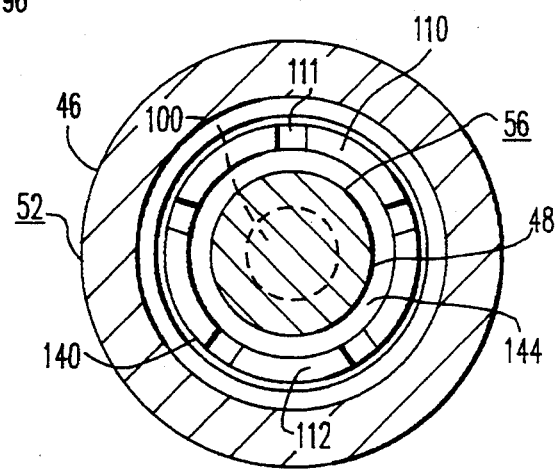
FIG. 16 is a sectional view along line XVI—XVI of FIG. 14.
Figure 15:
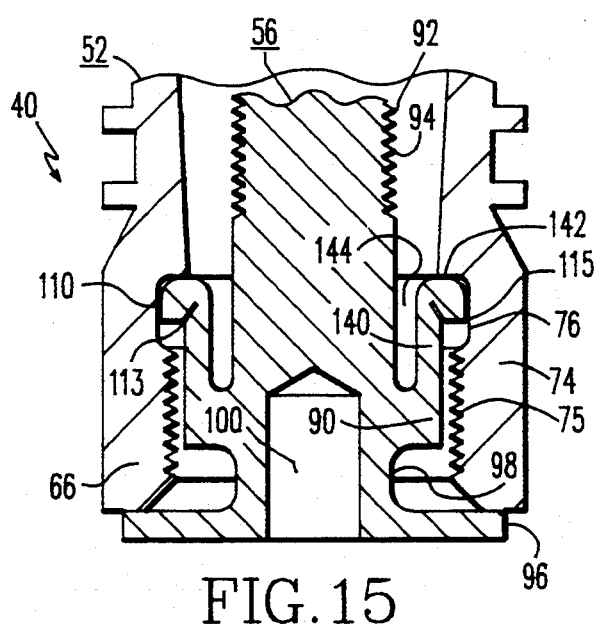
FIG. 15 is a partial vertical section of the tube plug illustrated in FIG. 14 having the bolt means fully installed within the shell of the tube plug.

Referring to FIGS. 14–16 and using the same reference characters to define like parts, an alternative embodiment of the tube plug 40 may comprise of the bolt means 56 integrally formed with the locking means, such as locking means 140. The bolt means 56 is disposed in the open end 66 of the shell 52. The bolt means 56 has a flange 96 extending outwardly from the outward end portion 90 of the bolt means 56 and across the open end 66 of the shell 52. A recess 98 may be positioned near the flange 96 to provide flexibility to the flange 96 for enabling the flange 96 to abut against the shell 52 for sealing engagement of the shell 52 and the bolt means 56. A deformable tab portion 110 may be integrally formed with the bolt means 56 and has an undercut 113 for providing flexibility to enable the tab portion 110 to be deformed. Referring to FIG. 16, the tab portion 110 has a series of slits 111 in the tab portion 110 and a series of castellated tabs 112 for relieving the hoop, stress in the tab portion 110 during deformation. The series of castellated tabs 112 may be a series of projecting tabs integrally formed on the tab portion 110. The deformable tab portion 110 is positioned so that when the bolt means 56 is installed within the tube plug 40, the deformable tab portion 110 will engage in the recess 76 of the shell 52. The tab portion 110 is originally in the straight position as illustrated in FIG. 14, which enables the bolt means 56 to be slid into the shell 52. The tab portion 110 is deformed so that the first surface 116 of the undercut 113 is bent toward the second surface 118 of the undercut 113 and is in a position as illustrated in FIG. 15.

Referring to FIG. 14, because the initial length between the end 115 of the tab portion 110 and the flange 96 is longer than the internal clearance between the flange 96 and the recess 76, during installation of the bolt means 56, the surface 142 of the recess 76 abuts end 115 of the tab portion 110 and plastically deforms tab portion 110 into the recess 76 to provide an interference of the tab portion 110 with the recess 76 for fastening or locking the bolt means 56 and the shell 52 together. A groove 144 may be positioned near the deformable tab portion 110 and between the recess 98 and the inward end portion 92 of the bolt means 56 to provide flexibility to the tab portion 110 for enabling the tab portion 110 to be deformed into the recess 76 of the shell 52. The inward end portion 92 of the bolt means 56 has outside diameter threads 94 for threaded engagement with the inside diameter threads 95 of the expander member 54 for sealing the chamber 70 defined by the shell 52, and for locking or fastening together the shell 52, the expander member 54, the bolt means 56, and the locking means 140.

OPERATION

Referring again to FIGS. 2 and 3, the shell 52 and the expander member 54 may be positioned within the tube 22, as described in U.S. Pat. No. 4,390,042 issued Jun. 28, 1983 to Kucherer et al. entitled "Tube Plug", and assigned to the assignee of the present invention. Locking cup 58 is slid onto the inward end portion 92 of the bolt means 56 and toward the taper 93 and the outward end portion 90 of the bolt means 56 until the locking cup 58 tightly fits onto the outward end portion 90 of the bolt means 56. An installation tool (not shown) is inserted into the cavity 100 of the bolt means 56 to install the bolt means 56 and locking cup 58 into the shell 52.

The installation tool (not shown) provides a torque sufficient to deform the locking cup 58 into position and sufficient to result in a preload in the tube plug 40 to prevent significant leakage of fluid into the chamber 70 of the shell 52 through the metal-to-metal abutment of the flange 96 and shell 52 and through the metal-to-metal abutment of the tab portion 110 and the recess 98. The torque applied also is sufficient to prevent loosening of the tube plug 40 while the tube plug 40 is in service and sufficient to keep a compressive load on the shell 52 for reducing the possibility of a separation of the shell 52 due to stress corrosion cracking.

Referring again to FIGS. 2 and 4, the bolt means 56 with the locking cup 58 fit onto the taper 93 is threaded into the expander member 54 positioned within the shell 52. As the bolt means 56 is threaded into the expander member 54, the frictional fit between the locking cup 58 and the bolt means 56 causes the locking cup 58 to advance along the taper 93 of the bolt means 56 and toward the outward end portion 90 of the bolt means 56, where the locking cup 58 threads into the skirt portion 74 of the shell 52. The locking cup 58 may thread faster into the shell 52 than the bolt means 56 threads into the expander member 54 due to the difference in pitch size of the inside diameter threads 86 of the expander member 54 and the inside diameter threads 75 of the skirt portion 74 of the shell 52.

Referring again to FIGS. 4 and 5, the inward open end 104 of the locking cup 58 seats in the recess 76 of the shell 52 prior to the flange 96 of the bolt means 56 abutting the shell 52, due to the initial longer length of the locking cup 58 as compared to the internal clearance between the flange 96 and the recess 76. After the seating of the inward open end 104 and as the bolt means 56 continues to thread into the expander member 54, the flange 96 or surface 99 abuts end 115 of tab portion 110 and plastically deforms the tab portion 110 of the locking cup 58 into the recess 98 of the bolt means 56 by bending the first surface 116 of the undercut 113 toward the second surface 118 of the undercut 113. After the tab portion 110 engages the recess 98, the flange 96 abuts the shell 52. The recess 98 allows flexibility for the flange 96 to sealingly abut the shell 52 for sealing the chamber 70 of the shell 52. The threaded engagement of the locking cup 58 and the shell 52, the threaded engagement of the expander member 54 and the bolt means 56, and the engagement of the tab portion 110 of the locking cup 58 and the recess 98 of the bolt means 56 locks or fastens the shell 52, the expander member 54, the bolt means 56, and the locking cup 58 together for providing a tube plug 40 to prevent fluid flow through tube 22.

Referring again to FIGS. 6–9, in addition to the interaction of the parts as described above, the one or more pins 122 are positioned within the one or more openings 120 in the locking cup 119 to provide a pressure fit between the pins 122 and the locking cup 119. As the locking cup 119 is threaded into the skirt portion 74 of the shell 52, the pins 122 slide along the taper 93 of the bolt means 56 until the pins 122 are forced outward by the taper 93 to engage in the recess 76 of the inside diameter threads 75 of the skirt portion 74 of the shell 52. The pins 122 may penetrate a distance into the bolt means 56 for providing an additional locking or fastening feature.

Referring again to FIGS. 10–13, in addition to the interaction of the parts as described above, one or more pins 132 are positioned within one or more openings 130 in the locking cup 129 to provide a pressure fit between the pins 132 and the locking cup 129. As the locking cup 129 is threaded into the skirt portion 74 of the shell 52, the pins 132 engage in the recess 98 of the bolt means 56. The pins 132 may penetrate a distance into the sloped counterbore 134 of the shell 52 for providing an additional locking or fastening feature.

Referring again to FIGS. 14–16, the bolt means 56 is threaded into the expander member 54 by utilizing an installation tool (not shown) inserted into the cavity 100. As the bolt means 56 is threaded into the expander member 54, the end 115 of the tab portion 110 of the locking means 140 abuts the surface 142 of recess 76 of the shell 52 prior to the flange 96 of the bolt means 56 abutting the shell 52. After the tab portion 110 abuts the surface 142 of the recess 76 and as the bolt means 56 continues to thread into the expander member 54, the tab portion 110 is plastically deformed by the surface 142 of the recess 76 bending the first surface 116 of the undercut 113 toward the second surface 118 of the undercut 113 to engage the tab portion 110 in the recess 76. The recess 98 provides the flexibility for a sealingly abutment between the flange 96 and the shell 52 and groove 144 provides the flexibility for a sealingly abutment between the tab portion 110 and the shell 52 to seal the chamber 70 of the shell 52. The installation tool (not shown) provides a torque sufficient to deform the locking means 140 into position and sufficient to result in a preload in the tube plug 40 to prevent significant leakage of fluid into the chamber 70 of the shell 52 through the metal-to-metal abutment of the flange 96 and shell 52 and through the metal-to-metal abutment of the tab portion 110 and the recess 76. The threaded engagement of the bolt means 56 and the expander member 54, and the engagement of the tab portion 110 of the locking means 140 and the recess 76 of the shell 52 locks or fastens the shell 52, the bolt means 56, and the locking means 140 together for providing a tube plug 40 to prevent fluid flow through tube 22.

Referring again to FIGS. 2–16, to remove the tube plug 40 from the tube 22, the bolt means 56 must be removed from the shell 52 and then the tube plug 40 may be removed by methods well known in the art. To remove the bolt means 56 from the shell 52, a removal tool (not shown) is inserted into the cavity 100 in the flange 96 and provides a torque sufficient to plastically deform the tab portion 110 so that the tab portion 110 disengages from the recess 76 or the recess 98. The torque must also be sufficient to overcome the resistance from the difference in the pitch sizes of the threads 75 of the skirt portion 74 of the shell 52 and of the threads 86 of the expander member 54. The torque must also be sufficient to disengage the one or more pins 122 from the recess 76 and the one or more of pins 132 from the recess 98.

Therefore, the invention provides a tube plug that automatically locks or fastens together the plurality of members comprising the tube plug as the members of the tube plug are installed within the tube, a locking or fastening means that locks or fastens the bolt means to the shell at any elevation of the shell within the tube, and a tube plug that has a reduced susceptibility to stress corrosion cracking due to the reduction of primary fluid within the chamber of the tube plug.

We claim:

1. A fastener for securing a plurality of members together, comprising:
    a first member having a bore at least partially therein, said bore having a threaded portion;
    a second member disposed in said bore of said first member;
    at least one of said first and said second members having a recess therein which faces the other of said first and said second members; and
    means for locking said first member and said second member together, said means for locking being formed as part of said first or said second member and having a deformable tab portion therein, said tab portion having an undercut positioned between an end of said tab portion and the remainder of said locking means so that when said second member is installed within said first member, a bending means on one of said first and said second members forces a first surface of said undercut to bend toward a second surface of said undercut, said tab portion plastically deformable to reduce said undercut by movement of said tab portion into said recess for fastening said first member and said second member together.

2. Fastener according to claim 1 wherein said locking means is integrally formed with said second member.

3. Fastener according to claim 2 wherein said first member further comprises a recess positioned between opposite ends of said first member for forcing said first surface of said undercut to bend toward said second surface of said undercut, as said second member is installed within said first member, and for engaging said tab portion in said recess for securing said first member, said second member, and said locking means together.

4. Fastener according to claim 1 wherein said second member further comprises a flange extending radially outward from an end of said second member and across an open end of said first member for sealing said bore of said first member.

5. Fastener according to claim 4 wherein said locking means is a locking cup disposed in said bore of said first member having said tab portion at one end and having outside diameter threads for threadedly engaging said threaded portion of said bore of said first member for securing said first member, said second member, and said locking cup together.

6. Fastener according to claim 5 wherein said second member further comprises a recess positioned adjacent to said flange for engaging said tab portion of said locking cup in said recess of said second member as said flange forces said first surface of said undercut to bend toward said second surface of said undercut, as said second member and said locking cup are installed within said first member, for securing said first member, said second member, and said locking cup together.

7. Fastener according to claim 1 wherein said first member is a shell having a closed end, an open end, and an outer wall defining a chamber in said shell for plugging a tube.

8. Fastener according to claim 7 wherein said second member is bolt having an inward end portion and a outward end portion, disposed in said open end of said shell, for sealing said chamber defined by said shell.

* * * * *